(12) United States Patent
Mercier

(10) Patent No.: US 7,648,148 B1
(45) Date of Patent: Jan. 19, 2010

(54) LEANING VEHICLE WITH TILTING FRONT WHEELS AND SUSPENSION THEREFOR

(75) Inventor: Daniel Mercier, Magog (CA)

(73) Assignee: Bombardier Recreational Products Inc., Valcourt (CA)

( * ) Notice: Subject to any disclaimer, the term of this patent is extended or adjusted under 35 U.S.C. 154(b) by 516 days.

(21) Appl. No.: 11/429,000

(22) Filed: Jul. 6, 2006

Related U.S. Application Data

(60) Provisional application No. 60/696,532, filed on Jul. 6, 2005.

(51) Int. Cl.
*B60G 21/00* (2006.01)
*B60G 7/00* (2006.01)
*B62D 61/06* (2006.01)

(52) U.S. Cl. .............................. 280/124.103; 280/5.509; 280/6.15; 280/124.134; 180/210

(58) Field of Classification Search ............ 280/124.03, 280/124.134, 124.135, 5.508, 5.509, 5.52, 280/62, 6.15; 180/210
See application file for complete search history.

(56) References Cited

U.S. PATENT DOCUMENTS

| | | | |
|---|---|---|---|
| 2,260,102 A * | 10/1941 | Freret | 280/5.509 |
| 5,116,069 A * | 5/1992 | Miller | 280/62 |
| 5,927,424 A | 7/1999 | Van Den Brink | |
| 6,328,125 B1 | 12/2001 | Van Den Brink | |
| 6,435,522 B1 | 8/2002 | Van Den Brink | |
| 6,863,288 B2 | 3/2005 | Van Den Brink | |
| 2002/0190494 A1* | 12/2002 | Cocco et al. | 280/124.135 |
| 2004/0051269 A1* | 3/2004 | Bouton | 280/124.103 |
| 2005/0167174 A1* | 8/2005 | Marcacci | 180/76 |
| 2005/0206101 A1* | 9/2005 | Bouton | 280/6.154 |
| 2006/0097471 A1 | 5/2006 | Van Den Brink | |

* cited by examiner

*Primary Examiner*—Ruth Ilan
*Assistant Examiner*—Keith Frisby
(74) *Attorney, Agent, or Firm*—Osler, Hoskin & Harcourt LLP

(57) ABSTRACT

A leaning vehicle has a frame pivotally connected to the lower end of a shock tower, the pivotal connection defining a frame leaning axis wherein the frame is adapted to lean to a right side and to a left side relative to the shock tower about the frame leaning axis. The leaning vehicle includes an actuator operatively connected to the frame and to the shock tower which is adapted to impart a leaning motion to the frame relative to the shock tower about the frame leaning axis.

22 Claims, 13 Drawing Sheets

LEANING VEHICLE WITH TILTING FRONT WHEELS AND SUSPENSION THEREFOR

CROSS REFERENCES TO RELATED APPLICATIONS

The present Utility Patent Application claims priority from U.S. Provisional Patent Application No. 60/696,532 filed Jul. 6, 2005; the contents of which are incorporated herein by reference.

FIELD OF THE INVENTION

The present invention relates to front suspension assemblies in general and in particular relates to a front suspension for a vehicle adapted to lean into a turn.

BACKGROUND OF THE INVENTION

Leaning vehicles having more than one front or rear wheels require a frame that is pivotally connected to the two-wheel suspension assembly to permit the vehicle to lean. One such vehicle is disclosed in U.S. Pat. No. 6,328,125 (Van Den Brink et al.), which describes a three-wheel vehicle having a frame pivotally connected to a two-wheel rear suspension assembly, and drive train structured in such a way that, the frame and the front wheel can lean into a corner while the two rear wheels remain substantially vertical.

In addition to having the frame lean into a corner while turning a leaning vehicle, the two front or rear wheels of the leaning vehicle may also tilt in the same direction as the frame to reflect the general behavior of a motorcycle. In order to allow the two front or rear wheels to lean to one side or the other, the suspension assembly must be connected to the wheels in such a manner that the suspension components do not interfere with the leaning wheels. An improvement of the vehicle disclosed in U.S. Pat. No. 6,328,125 in which the two rear wheels can lean into a corner is disclosed in U.S. Pat. No. 6,863,288 also to Van Den Brink et al.

US Pat Application No. 2005/0167174 A1 (FIG. 3) discloses a relatively complex front suspension and steering system for a leaning vehicle equipped with a pair of independent front upright suspensions mounted on an 'articulated quadrilateral structure' adapted to tilt the front wheels with the frame when negotiating a curve. The disclosed suspension is adapted to allow the front wheels to independently move up and down while simultaneously remaining parallel to each other and to the frame when the vehicle is leaning into a corner like a motorcycle. This suspension system is bulky and complex and it is specifically designed for two front wheels that are relatively close to one another. This type of suspension would be difficult to employ on a larger vehicle in which the wheels are farther apart.

Another well known type of front suspension assembly used in leaning vehicles in which the front wheels tilt into the corner is the double A-arm type front suspension. The double A-arm type suspension is adapted to transmit the leaning motion of the vehicle frame to the wheels by virtue of its substantially parallel upper and lower A-arms connected to upper and lower points of the wheels respectively. When the vehicle leans into a right corner for instance, the right upper A-arm pushes on the upper point of the right wheel while the right lower A-arm pulls on the lower point of the right wheel thereby tilting the right wheel towards the corner. At the same time, the left upper A-arm pulls on the upper point of the left wheel while the left lower A-arm pushes on the lower point of the left wheel thereby tilting the left wheel towards the right corner as well. One such vehicle is the Mercedes F300 Life Jet which was first unveiled at the 1997 Frankfurt Motor Show (Germany) but never reached production. This type of front suspension with the appropriate tilting connections allows the wheels and frame to lean, however the angle to which the wheels can lean and thus the angle to which the vehicle frame can lean is limited. Furthermore, the left and right spring and shock absorber assemblies are directly involved in the leaning of the vehicle such that the suspension becomes less effective when the vehicle is leaning. Also, the displacements of multiple A-arms implies that the front of the vehicle must remain substantially free of other components to avoid interferences.

Thus, there exists a need for a leaning vehicle having a two-wheel front suspension assembly that permits tilting of the wheels to a greater degree than that of the prior art leaning vehicles and that remains effective when the vehicle is leaning into a corner.

STATEMENT OF THE INVENTION

One aspect of some embodiments of the present invention is to provide a leaning vehicle comprising a frame having a front portion, a rear portion, a lower portion and an upper portion; an engine supported by the frame; a shock tower having an upper end and a lower end, the lower end of the shock tower pivotally connected to the front portion of the frame at a pivotal connection defining a frame leaning axis about which the frame can lean to a right side and to a left side relative to the shock tower; a front left wheel and a front right wheel connected to the front portion of the frame via a front left suspension assembly and a front right suspension assembly respectively; a steering assembly having a rotatable steering column supported by the frame and operatively connected to the front left wheel and the front right wheel; a rear suspension connected to the rear portion of the frame; at least one rear wheel connected to the rear suspension; at least one of the wheels being operatively connected to the engine; a braking system operatively connected to at least one wheel; each front suspension assembly including a lower suspension arm pivotally connected to the frame at a first end and pivotally connected to the wheel at a second end; a shock absorber having an upper end connected to the upper end of the shock tower and a lower end connected to either the lower suspension arm or another suspension arm; and an actuator operatively connected to the frame and to the shock tower, the actuator adapted to impart a leaning motion to the frame relative to the shock tower about the frame leaning axis.

Another aspect of some embodiments of the present invention is to provide a leaning vehicle comprising an electronic control unit ECU electrically connected to at least one sensor adapted to detect a direction and magnitude of a torque applied to the steering column and to send corresponding signals to the ECU representative of the direction and magnitude of the torque applied to the steering column; the ECU being operatively connected to the actuator; wherein in response to signals from the at least one sensor, the ECU sends command signals to the actuator to lean the frame relative to the shock tower in a direction and at a speed corresponding to the direction and magnitude of the torque applied to the steering column.

Yet another aspect of some embodiments of the present invention is to provide an actuated lock to secure the frame to the shock tower and prevent relative movement between the frame and the shock tower about the frame leaning axis.

Yet another aspect of some embodiments of the present invention is to provide a vehicle speed sensor electrically connected to the ECU and adapted to send signals to the ECU representative of the speed of the vehicle wherein when the vehicle speed sensor sends a signal below a threshold value representative of a minimum vehicle speed, the ECU sends no command signal to the actuator and a rotation of the steering column is independent of the leaning of the frame relative to the shock tower.

Yet another aspect of some embodiments of the present invention is to provide a leaning vehicle in which each front suspension assembly includes a lower suspension arm and a spindle carrying the wheel and a braking system, the lower suspension arm pivotally connected to the frame at a first end and pivotally connected to the spindle at a second end thereby defining the wheel tilting axis; a shock absorber having an upper end connected to the upper end of the shock tower and a lower end connected to the lower suspension arm; wherein the spindle is adapted to transmit all of a braking torque produced by the braking system to the lower suspension arm.

For the purposes of this application, terms used to locate elements on the vehicle such as front, back, rear, left, right, upper, lower, up, down, above and below are as they would normally be understood by a rider of the vehicle sitting on the vehicle in a forwardly facing, driving position. For the purposes of this application, the term "shock tower" means a supporting structure for a shock absorber assembly.

Embodiments of the present invention each have at least one of the above-mentioned aspects, but not necessarily have all of them.

Additional and/or alternative objects, features, aspects and advantages of the embodiments of the present invention will become apparent from the following description, the accompanying drawings and the appended claims.

BRIEF DESCRIPTION OF THE DRAWINGS

For a better understanding of the present invention as well as other objects and further features thereof, reference is made to the following description which is to be used in conjunction with the accompanying drawings, where.

DESCRIPTION OF PREFERRED EMBODIMENT(S)

Figure 1:
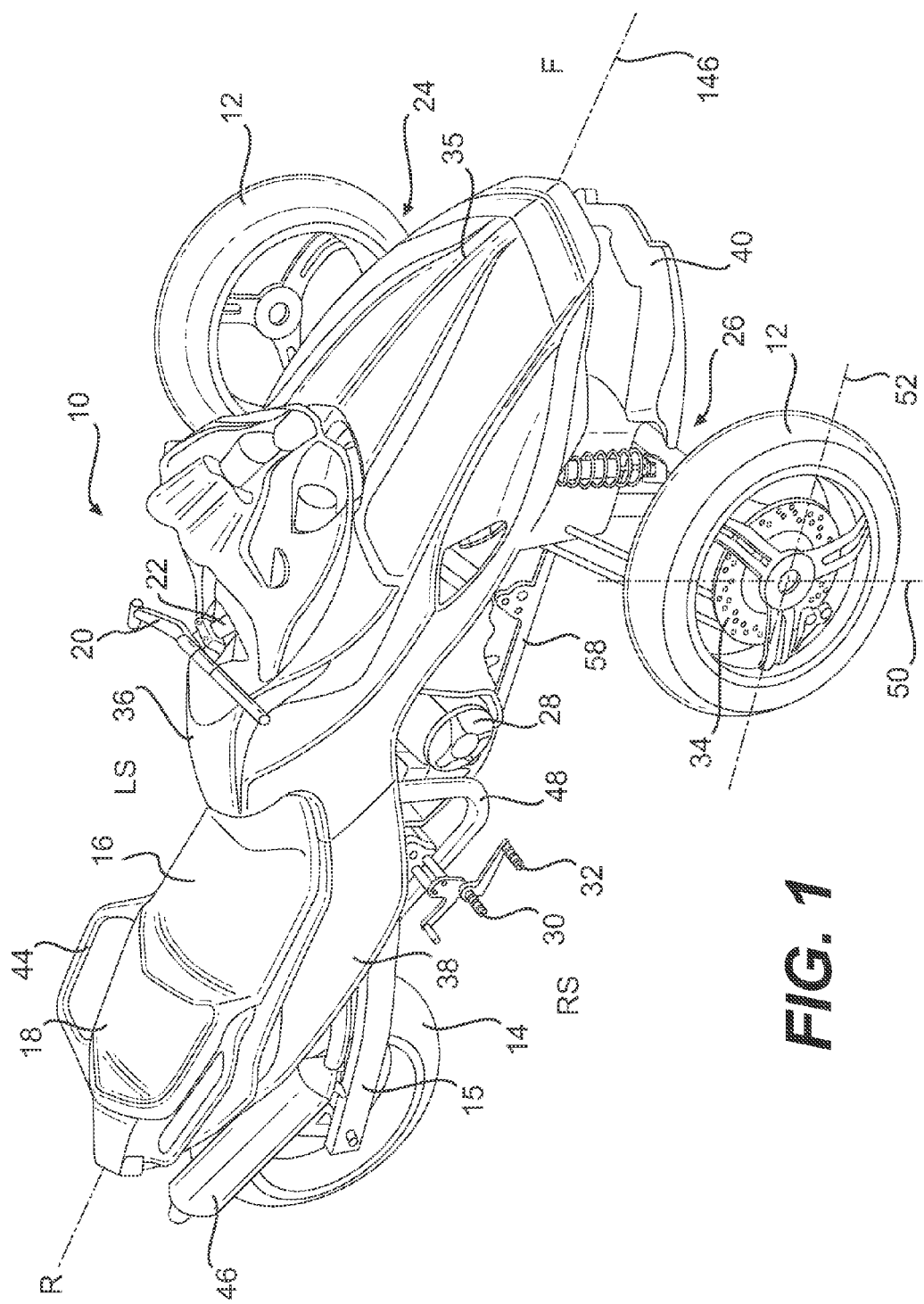
FIG. 1 is a front right perspective view of a three-wheel leaning vehicle including a front suspension in accordance with a first embodiment of the invention.

FIG. 1 illustrates a three-wheel leaning vehicle 10 in accordance with a specific embodiment of the invention. The particular aesthetic design details of the three-wheel vehicle 10 are not critical to this invention, and FIG. 1 merely illustrates one possible configuration. The three-wheel leaning vehicle 10 has a left side LS, a right side RS, a front F, and a rear R when viewed by a driver driving the vehicle. Vehicle 10 includes a frame 58 that supports and houses an engine 28, which could be any type of power source such as an internal combustion engine or an electric motor. A straddle-type seat 16 is mounted on the frame 58 and preferably has a driver seat portion and a passenger seat portion 18 disposed behind the driver seat portion. The leaning vehicle 10 features two front wheels 12; one on the left side and one on the right side of a longitudinal axis 146, and a single central rear wheel 14. The central rear wheel 14 is suspended by a rear suspension system 15 attached to the rear portion of the frame 58 and is operatively connected to the engine 28 through any suitable power transmission mechanism such as gearbox or continuously-variable transmission coupled to an endless belt, chain, or driveshaft assembly. A steering mechanism such as handle bars 20 in front of the seat 16 are connected to the front wheels 12 via a steering column 22 to steer the vehicle 10. Left and right suspension assemblies 24, 26 attach the front wheels 12 to the vehicle 10 to permit the turning of wheels 12 about a substantially vertical steering/king pin axis 50 and tilting of the wheels 12 about wheel tilting axis 52.

Foot pegs 30 (only right side shown) project from vehicle 10 so that the driver may rest his/her feet thereupon while driving. A brake pedal 32 is situated in front of the right foot peg 30 to apply the front brakes 34 and rear brakes (not shown). Leaning vehicle 10 also includes a plurality of fairings 35, 36, 38, and 40 which serve to protect the vehicle components from the elements during use and render the vehicle aerodynamically efficient and aesthetically pleasing. A windshield is preferably placed in front of the handle bars 20 to protect the driver from oncoming wind. Left and right passenger handles 44 are attached to each side of the passenger seat portion 18. A muffler 46, in fluid communication with the engine 28 via pipe 48, is attached to the rear R of the vehicle 10. Any suitable known combination of header pipes to muffler could be used.

In operation, the left and right suspension assemblies 24 and 26 are connected to the frame 58 of the three-wheel leaning vehicle 10, as described herein below, to permit the frame 58 and therefore the driver and the single central rear wheel 14 to lean towards the right side or the left side much like a motorcycle. Additionally, the front wheels 12 are connected to the left and right suspension assemblies 24 and 26 in such a way that the front wheels 12 also tilt when the frame is leaning into a corner thereby duplicating a motorcycle behavior and driving style with a three-wheel vehicle.

With reference to FIGS. 2-8, the front suspension assembly 26 will be described in detail. Reference will be made only to the right side front suspension assembly 26 since the left side front suspension assembly 24 is a mirror image thereof.

Figure 2:
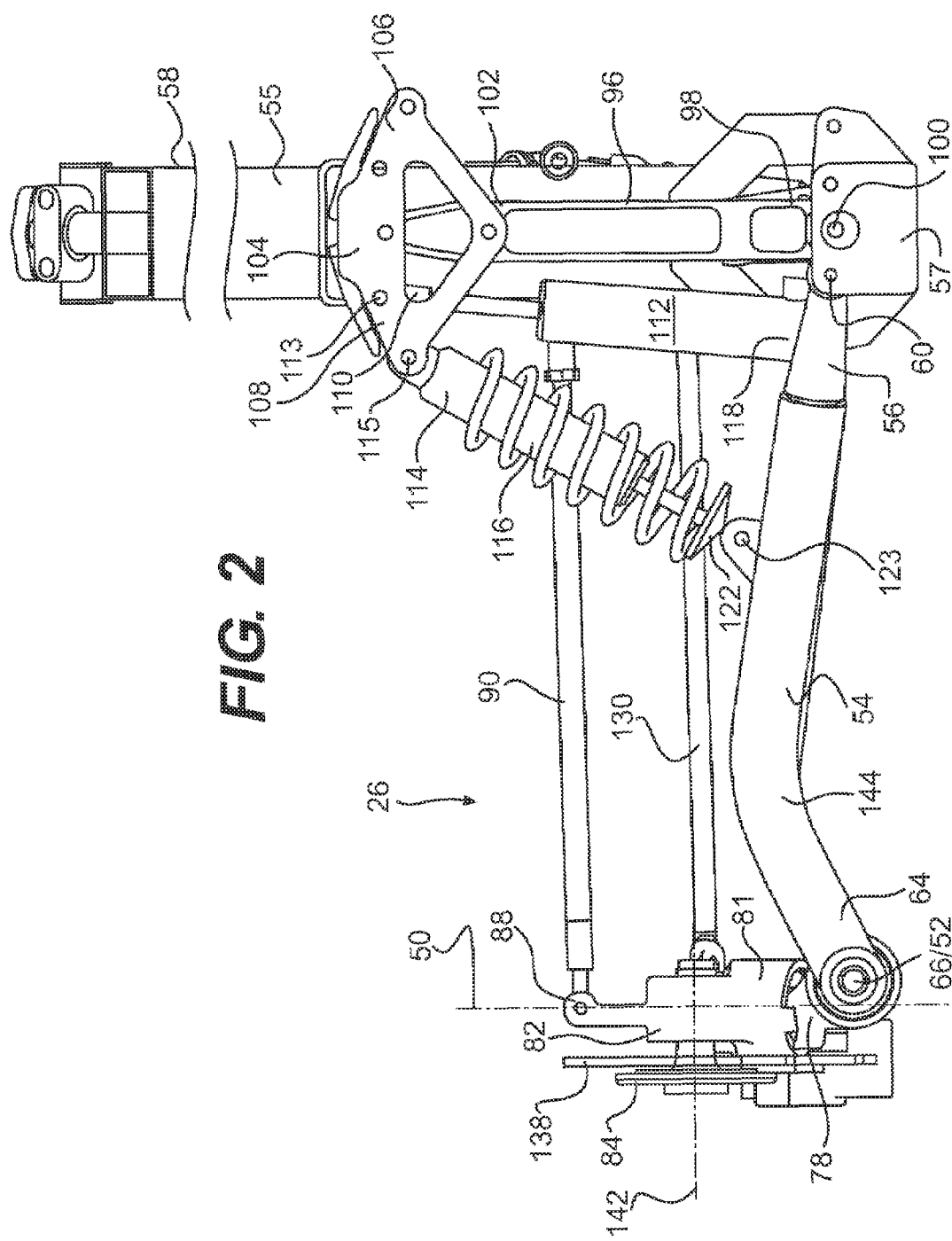
FIG. 2 is a front elevation view of the right side of the front suspension of the three-wheel leaning vehicle of FIG. 1 including a portion of the vehicle frame, the left side of the front suspension being a mirror image thereof having been removed for clarity.

With reference to FIG. 2, front suspension assembly 26 includes a lower suspension arm 54 pivotally attached at a first end 56 to a bracket 57 rigidly attached to a lower portion of the frame 58, defining a first pivot point 60. The lower suspension arm 54 is also pivotally attached at a second end 64 to a lower portion 78 of a spindle 82, defining a second pivot point 66 as well as the wheel tilting axis 52. The spindle 82 is constructed of a knuckle 81 and a T-joint 78. T-joint 78 includes a shaft (not shown) inserted into knuckle 81 and aligned with the steering/king pin axis 50 such that the knuckle 81 may rotate relative to the T-joint 78 to steer the wheel about steering/king pin axis 50. A hub 84 is used to attach front wheel 12 to the front suspension assembly 26 such that the front wheel 12 rotates about rotation axis 142. Knuckle 81 also includes a steering arm 86 (FIG. 3) and a leaning arm 88. A leaning rod 90 connects the leaning arm 88 of knuckle 81 to the frame 58. A steering rod 130 connects the steering arm 86 of knuckle 81 to a steering mechanism 126 (FIGS. 4 and 5)

Figure 3:
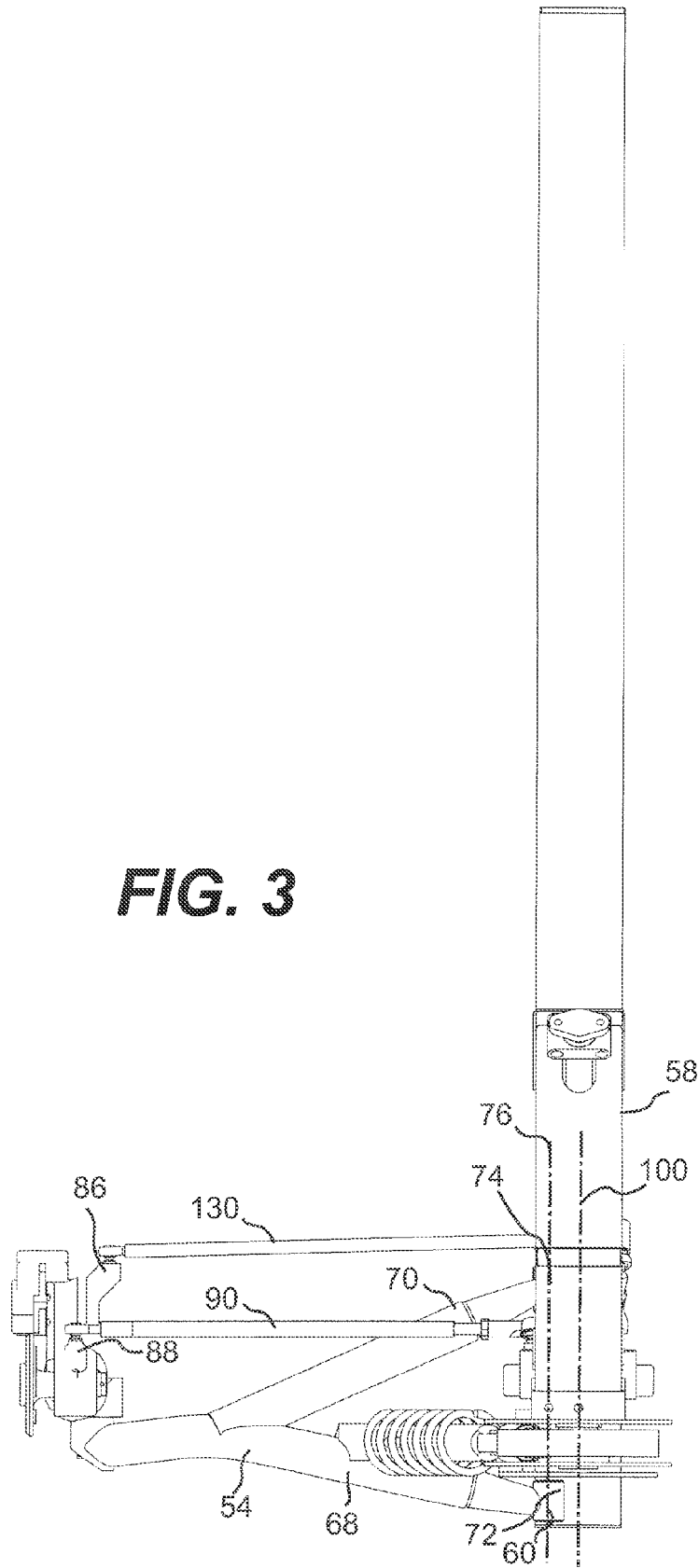
FIG. 3 is a top plan view of the front suspension and frame illustrated in FIG. 2.
Figure 7:
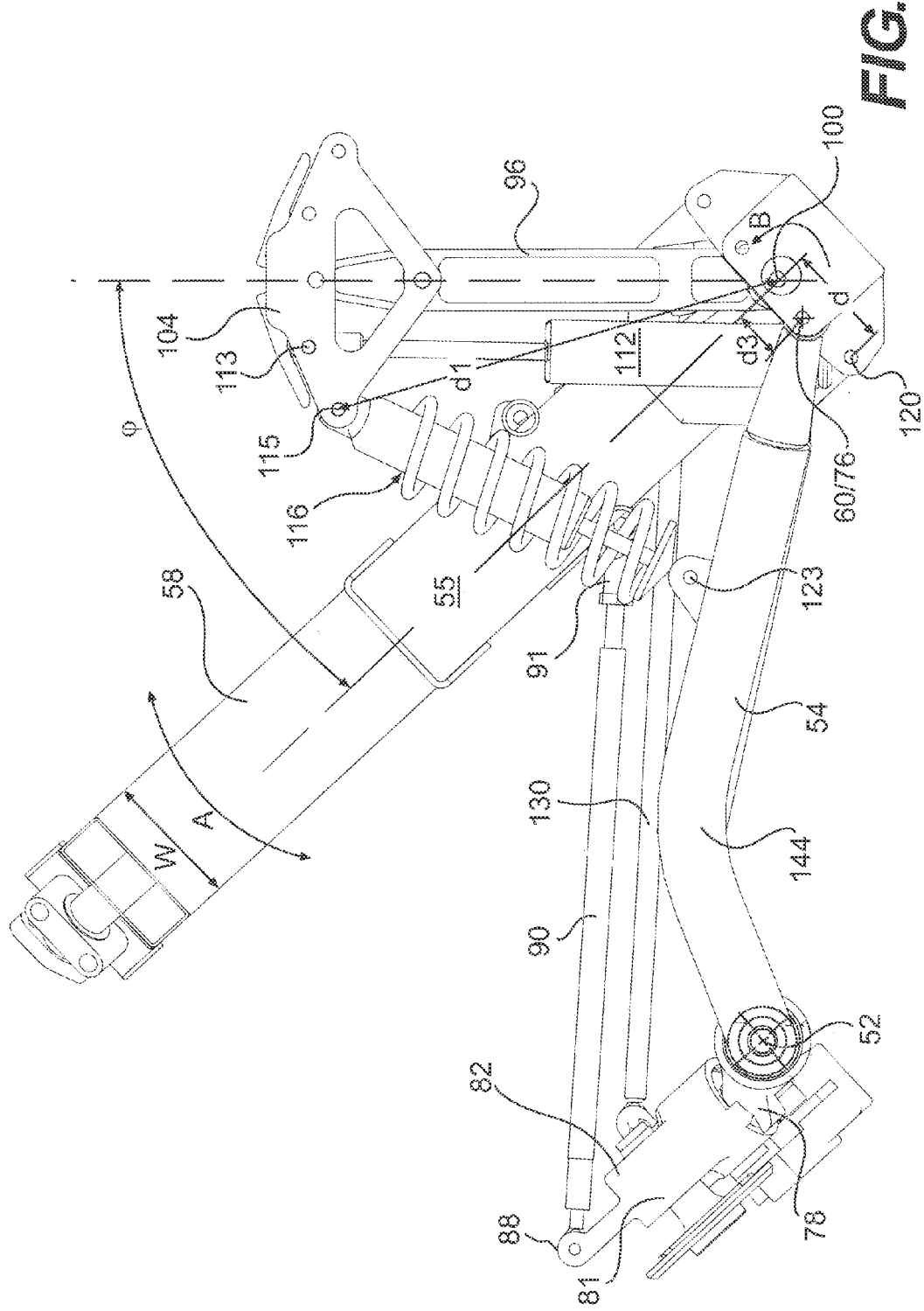
FIG. 7 is a front elevation view of the front suspension and frame illustrated in FIGS. 2 to 6, in a leaning position to the right.

With reference to FIG. 3, the lower suspension arm 54 includes a front portion 68 and a rear portion 70 to form a 'Y' or 'V' shape. The lower suspension arm 54 is attached to the frame 58 at a front location 72 and a rear location 74 which together define the pivoting axis 76 of the lower suspension arm 54. The pivoting axis 76 passes through pivot point 60. Lower suspension arm 54 also includes a curved portion 144, best seen in FIG. 2, between first and second ends 56 and 64. The upwardly curved portion 144 allows for clearance between the wheel 12 and the suspension arm 54 when the vehicle 10 is leaning to the right as best shown in FIG. 7. It is to be understood that the upwardly curved portion 144 lies above a plane including the pivoting axis 76 and the wheel tilting axis 52.

Figure 4:
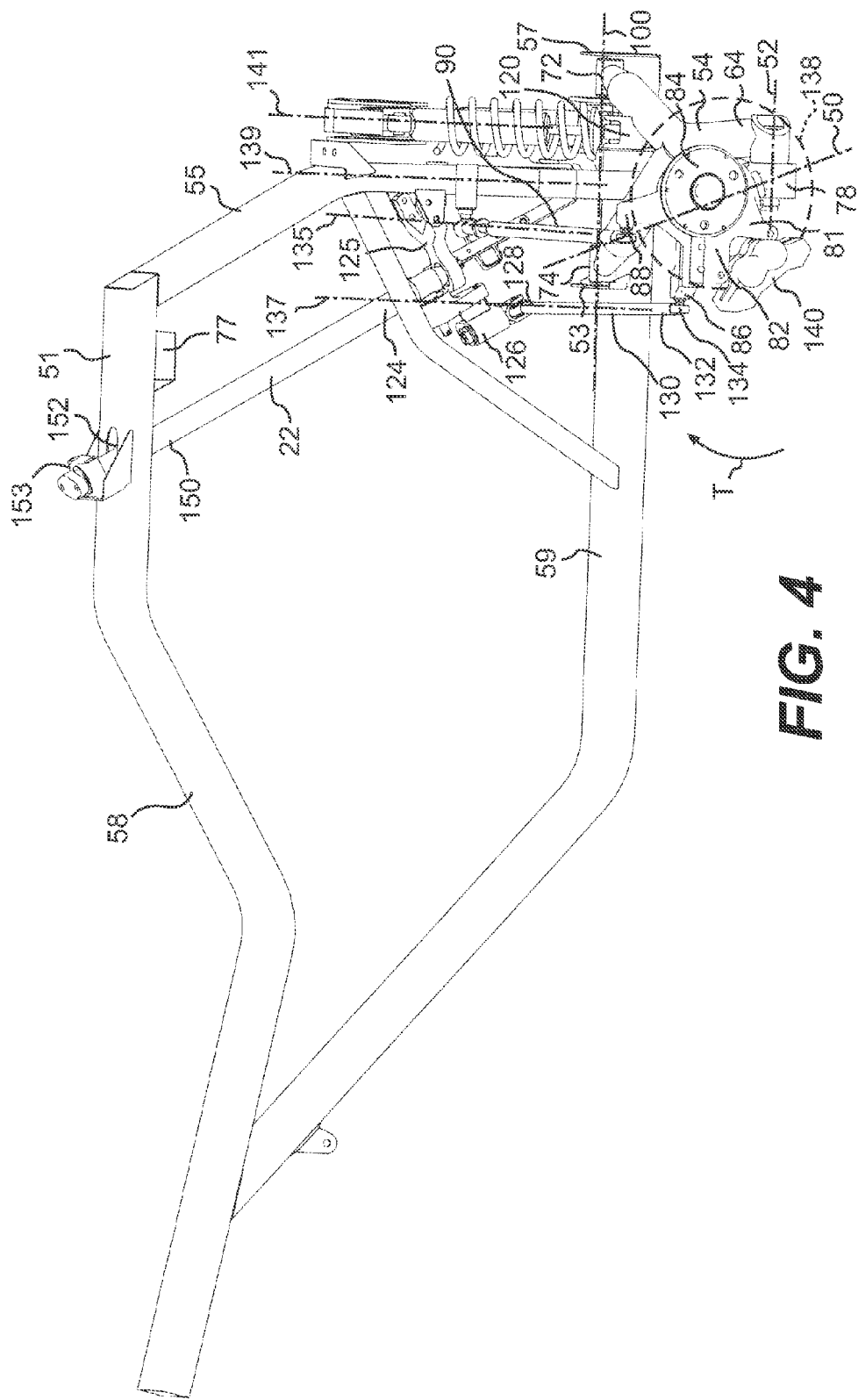
FIG. 4 is a right side perspective view of the front suspension and frame illustrated in FIGS. 2 and 3.
Figure 5:
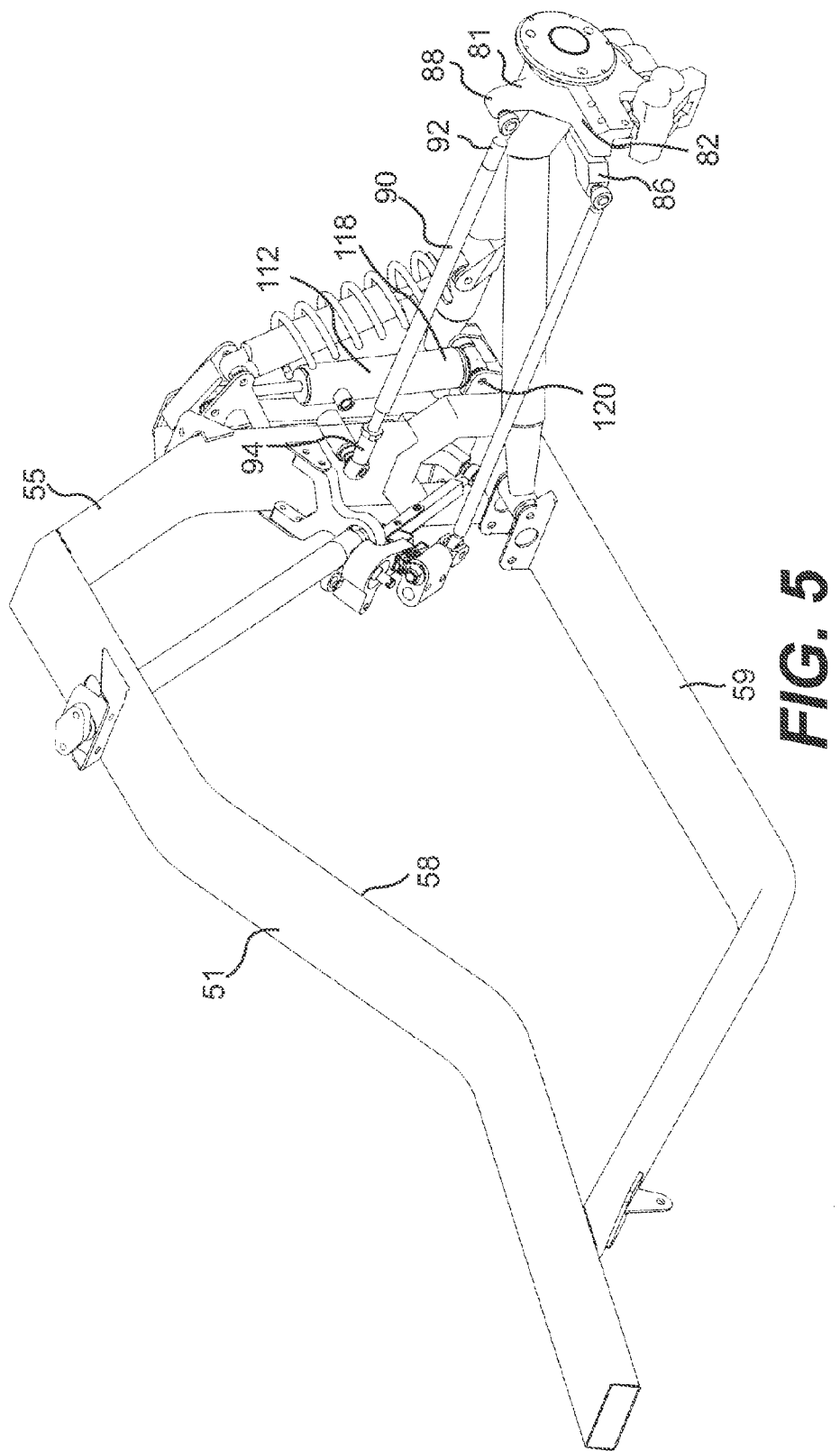
FIG. 5 is a rear right perspective view of the front suspension and frame illustrated in FIGS. 2 to 4.

With reference to FIG. 4, the frame 58 includes a lower member 59, an upright member 55 and an upper member 51. The lower member 59 is curved upwardly at the rear to connect with the upper member 51. The upright member 55 joins the front of the upper member 51 to the front of the lower member 59 to form a rigid frame 58. Brackets 57 and 53 are connected to the lower member 59 at forward location 72 and rear location 74 respectively to which the front and rear portions 68 and 70 of the lower suspension arm 54 are connected. An upper end 150 of the steering column 22 passes through an aperture 152 in the upper member 51 of the frame 58 and is supported by a bearing 153 mounted to the upper member 51. A lower end 124 of steering column 22 is supported by a bracket 125 mounted to the upright member 55 of the frame 58. Steering column 22 is connected to a steering linkage 126 which in turn is connected to a proximal end 128 of the steering rod 130. A distal end 132 of steering rod 130 is connected to the steering arm 86 of the spindle 82. Preferably, proximal end 128 and distal end 132 of steering rod 130 are connected to the steering linkage 126 and steering arm 86 via ball joints 134.

FIG. 4 illustrates the steering/king pin axis 50 which is defined by the T-joint 78 and the attachment point of the leaning arm 88 of spindle 82 to the leaning rod 90 about which the wheel 12 may turn in order to steer the vehicle 10. FIG. 4 also illustrates the wheel tilting axis 52 defined by the connection of the T-joint 78 with the end 64 of the lower suspension arm 54 about which the wheel 12 may tilt towards the frame 58 or away from the frame 58.

Referring now to FIG. 5 which is a rear perspective view of the right suspension assembly 26, a first end 92 of the leaning rod 90 is connected to the leaning arm 88 of knuckle 81 and a second end 94 of the leaning rod 90 is connected to the upright member 55 of the frame 58. The upright member 55 of the frame 58 is therefore directly connected to the leaning arm 88 of knuckle 81 to push or pull the spindle 82, via the leaning rod 90, to pivot about wheel tilting axis 52 when the frame 58 is leaning. The wheel 12 is therefore tilted when the frame 58 is leaning to one side or the other. Preferably, ball joints are used to connect the leaning rod 90 to the leaning arm 88 and the frame 58 so that the leaning rod 90 may only be subjected to tension and compression forces when pushing or pulling the spindle 82. The leaning rod 90 provides a rigid link to maintain the wheel camber.

Figure 6:
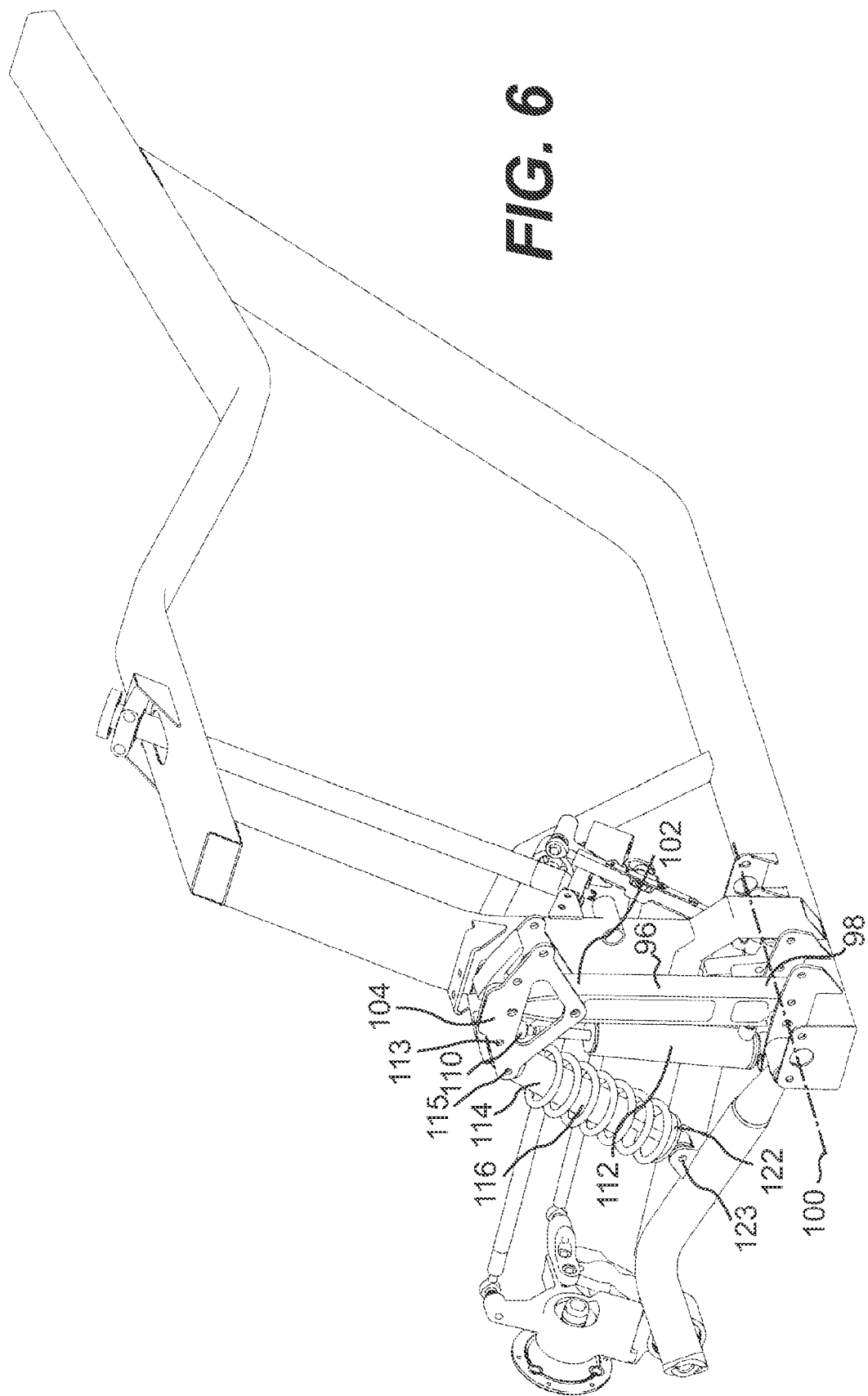
FIG. 6 is a front left perspective view of the front suspension and frame illustrated in FIGS. 2 to 5.

With reference to FIGS. 2, 5 and 6, a shock tower 96 is pivotally attached at a lower end 98 to the frame 58 to pivot about frame leaning axis 100. The frame 58 and the shock tower 96 may therefore pivot relative to one another about the leaning axis 100. The upper end 102 of the shock tower 96 includes a bracket 104 having a left side 106 and a right side 108. An upper end 110 of an actuator 112 is attached to the right side 108 of the bracket 104 at a pivot point 113 while the lower end 118 of the actuator 112 is connected to the lower member 59 of the frame 58 at pivot point 120 (FIG. 5). An upper end 114 of a shock absorber assembly 116 is attached to an extremity of the right side 108 of the bracket 104 at a pivot point 115 while the lower end 122 of the shock absorber assembly 116 is attached to the lower suspension arm 54 at pivot point 123. Although not shown, a second shock absorber and actuator are connected to the shock tower 96 and frame 58 on the left side of the shock tower 96, symmetrical about the frame leaning axis 100.

Actuator 112 is preferably an hydraulic actuator, but one skilled in the art would recognise that electrical or mechanical actuators could be used without deviating from the scope of the present invention.

Referring back to FIG. 4, a brake disk 138 shown in dotted lines is fixed to rotate with the hub 84. A brake calliper 140 is fixed to be stationary with the spindle 82. When the calliper 140 applies a braking force to the disc brake 138 to reduce the rotational speed of hub 84 and thus wheel 12, the spindle 82 is subjected to a torque in the direction of the arrow T (for a forward travelling direction of the vehicle). Because of the orientation of the axis 50, 52 and because the T-joint 78 cannot rotate in the direction of the torque T relative to the lower suspension arm 54, all of the torque T will be transferred to the lower suspension arm 54. As mentioned above, the ball joint connections of the leaning rod 90 do not resist any torque generated during braking, thus all the torque must be resisted by the lower suspension arm 54.

Having all the braking forces pass through the lower suspension arm 54 permits the leaning rod 90 to have a small diameter and occupy very little longitudinal space when compared to an upper A-arm of a conventional double A-arm suspension designed to withstand braking forces such as lower suspension arm 54. This leaves ample space for the wheel to tilt inwards without contacting other components, particularly when simultaneously steering the wheel through large steering angles. This design also allows for the necessary space to easily mount the shock absorber 116 to the shock tower 96.

Prior art designs having two A-arms, one situated above the other, allow the arms to be smaller since the torsion forces are distributed between the upper and lower A-arms. However this configuration limits the degree of leaning of the wheel. The single lower suspension arm 54 of the present invention is bulkier than typical double A-arms systems but allows the leaning rod 90 to be a small single rod thereby freeing space and allowing the wheels to lean farther than double A-arms systems.

The present configuration allows for sufficient space for all the front suspension components to articulate, lean, tilt and turn without interfering with one another. As illustrated in FIG. 4, the shock absorber 116 lies in a substantially vertical plane 141 substantially perpendicular to the frame leaning axis 100. The upright member 55 of frame 58 lies within a substantially vertical plane 139 which is substantially parallel to plane 141 in which the shock absorber 116 lies. Leaning rod 90 and steering rod 130 also lie within substantially vertical planes 135, 137 which are also substantially parallel to planes 141 and 139 in which the shock absorber 116 and the upright member 55 of frame 58 lie.

It is to be understood that while the frame 58 is leaning to the left or right, the wheels 12 are also leaning to the left or right and could also be simultaneously turning. The leaning of the frame 58 and the wheels 12 lowers the steering and leaning rods 130, 90 toward the lower suspension arm 54. Keeping the components in their respective substantially vertical plane throughout the leaning process ensures no interference between each component. Although the simultaneously turning of the wheel 12 about axis 50 while leaning the wheels 12 about axis 52 will cause some longitudinal movement of the steering and leaning rods 130, 90, the longitudinal distance between the components combined with the components remaining in substantially vertical planes ensures that there is no interference between the components.

With reference to FIG. 7, in operation, the driver turns the handlebars 20 and leans the frame 58 to the right side or left side in the direction of the arrow A to turn the vehicle, in a similar fashion to driving a two-wheeled motorcycle. The leaning rod 90, which is connected to the upright member 55 of the frame 58 at proximal end 94, applies a force to leaning arm 88 of the spindle 82. This force causes the spindle 82 to pivot at the T-joint 78 about wheel tilting axis 52 so that the wheel 12 is forced to tilt in the same direction as the frame 58. The steering rod 130 which is also connected to the upright member 55 of the frame 58 though the steering linkage 126 (FIGS. 4 and 5), remains substantially parallel to the leaning rod 90 such that no unwanted steering occurs while the vehicle 10 is leaning. In a preferred embodiment, the wheel 12 remains parallel to the frame 58 (tilting right or left with respect with the ground) when the frame 58 is leaning to the right or left, however the scope of the invention should not be so limited. In the preferred embodiment, the wheel tilting axis 52 is parallel to the frame leaning axis 100.

Although, FIG. 7 does not illustrate the wheel 12 and its tire, the curved portion 144 of the lower suspension arm 54 allows for clearance between the wheel 12 and the suspension arm 54 when the wheel 12 is leaning to the right. Obviously, the same can be said for the left suspension arm when the vehicle 10 is leaning to the left.

As can be seen in FIG. 7, when the vehicle 10 is leaning into a corner, the shock tower 96 remains upright while the frame 58 is pivoting about the leaning axis 100 such that the shock absorber assembly 116 of the front suspension is not directly involved in the leaning motion of the frame 58 as in prior art leaning vehicles with tilting wheels. The operation of the shock absorber assembly 116 is independent of the leaning motion of the frame 58. The motion ratio between wheel 12 and the shock absorber assembly 116 remains substantially constant while the frame 58 is leaning to provide unaltered wheel dampening while leaning into a corner and travelling over rough terrain at the same time. The motion ratio is the ratio between the vertical movement of the wheel 12 and the stroke of the shock absorber 116. A person skilled in the art would recognise that a substantial change in motion ratio due to the leaning of the frame 58 is not desirable. As can be seen in FIG. 7, the top pivot point 115 of shock absorber assembly 116 remains at a constant distance d1 from the frame leaning axis 100 when the frame 58 is leaning. However, the bottom pivot point 123 of shock absorber 116 (which is located on the lower suspension arm 54), follows the marginal displacement of lower suspension arm 54 downward and inward caused by the rotational displacement of its first pivot point 60 about the frame leaning axis 100 when the frame 58 is leaning to the right. The distance d3 defines the radius of the rotational displacement of the pivot point 60 about the leaning axis 100 when the frame 58 is leaning. By keeping d3 within a certain range, the change in motion ratio is minimal. Preferably, d3 is less than the lateral width W of the frame 58. It is to be understood that by decreasing distance d3, the motion ratio becomes less affected by the leaning of the frame 58. A fully constant motion ratio can be obtained by having lower suspension arm axis 76 (pivot point 60) coaxial with the frame leaning axis 100. In the illustrated embodiment, the lower suspension arm axis 76 (pivot point 60) is situated between the pivot point 120 of the actuator 112 and the frame leaning axis 100 in the lateral direction.

There are two modes of operation for the leaning vehicle 10. A first unassisted mode in which there is no actuation or any action from the actuator 112 and a second assisted mode in which the actuator 112 applies forces to the frame 58 to pivot about the frame leaning axis 100.

In a partially assisted mode, the actuator 112 which is connected to the upper end 102 of the shock tower 96 and to the lower member 59 of the frame 58 at pivot point 120 (FIG. 5) restrains and dampens the leaning motion of the frame 58 to provide a smooth transition and provide a limit or maximum leaning angle between the frame 58 and the shock tower 96 to prevent the vehicle 10 from over leaning and damaging the suspension components. In a preferred embodiment, the maximum leaning angle $\phi$ is 50°.

In the assisted mode, the actuator 112 applies forces to the frame 58 to pivot about the frame leaning axis 100. In a preferred embodiment, the actuator 112 is an hydraulic, electric or mechanical actuator connected to an Electronic Control Unit (ECU) 77 (FIG. 4) receiving inputs from one or more sensors which detect the direction and magnitude of a torque applied to the steering column 22 by the driver. As illustrated in FIG. 7, in the assisted mode, when the driver initiates a right-hand cornering manoeuvre, the right side actuator 112 pushes, i.e. lengthen its stroke, so that the pivot point 120 of the lower end of the actuator 112 is distanced from pivot point 113 of the upper end of the actuator 112 to create a moment B about leaning axis 100 to assists the frame 58 in leaning in the direction of arrow A. Moment B, is generated by the force applied by the actuator 112 at pivot point 120 at a distance d from leaning axis 100. The upright member 55 of the frame 58 in turn pushes leaning rod 90 to tilt the wheel 12 as discussed above. Simultaneously, the left side actuator (not shown) pulls or shortens its stroke to create the same moment B about frame leaning axis 100 and the upright member 55 of the frame 58 pulls on the left side leaning rod to tilt the left wheel 12 towards the right side substantially parallel to the right wheel 12.

Figure 8:
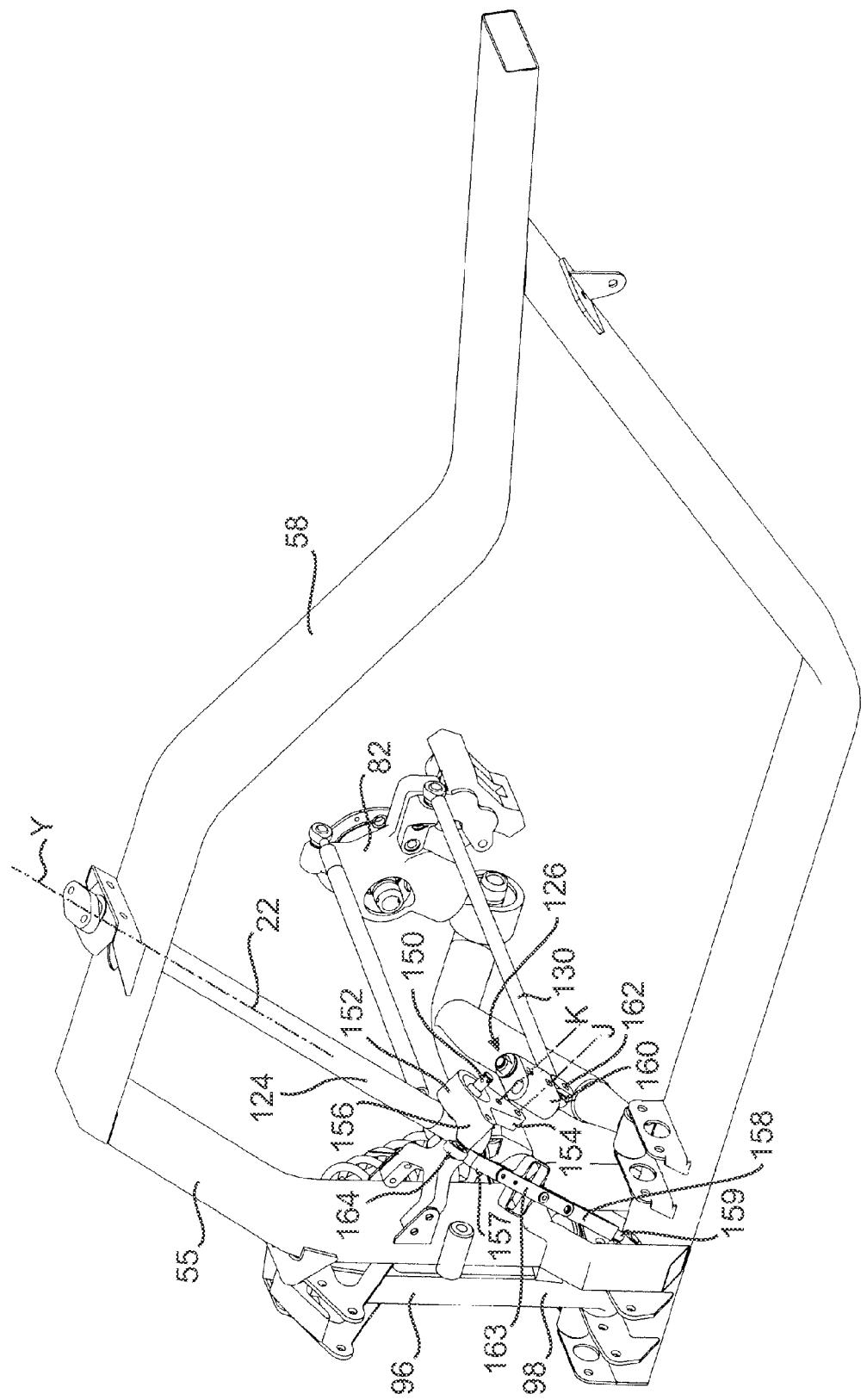
FIG. 8 is a rear left perspective view of the front suspension and frame illustrated in FIGS. 2 to 6.

With reference to FIG. 8, the steering linkage 126 connected to the lower end 124 of the steering column 22 and to the steering rod 130 is illustrated partially disassembled to show details. The steering linkage 126 includes a pitman arm shaft 150 fixed to the lower end 124 of the steering column 22 and extending substantially perpendicular to the steering column 22 such that when the steering column 22 rotates, the pitman arm shaft 150 moves laterally from left to right or right to left along a circular path defined by the axis Y of steering column 22. An L-shaped pitman link 152 is rotatably mounted onto the pitman arm shaft 150 via a bearing (not shown) such that pitman link 152 may rotate about the pitman arm shaft 150. The steering rod 130 is connected to the lower portion of a connector 160 itself bolted to the first leg 154 of the L-shaped pitman link 152 as illustrated by the dotted lines J and K. A second leg 156 of the L-shaped pitman link 152 is connected to a first end 157 of a torque sensing link 158 while the second end 159 of the torque sensing link 158 is connected to the lower end 98 of the shock tower 96. The torque sensing link 158 includes a linear strain sensing element 163 attached thereto and electrically connected to the ECU 77 so that extending and contracting deformation of the torque sensing link 158 will generate a proportional electrical signal which will be sent to an ECU 77. In operation, when the handle bars 20 are turned to the right, the steering column 22 rotates clockwise, moving the pitman arm shaft 150 laterally towards the left. The displacement of the pitman arm shaft 150 is transmitted to the L-shaped pitman link 152 which is prevented from rotating about the pitman arm shaft 150 by the torque sensing link 158. The first leg 154 pulls on the steering rod 130 though the connector 160 to turn the right spindle 82 (and the wheel 12) towards the right. The pulling force applied to the steering rod 130 through the first leg 154 of the L-shaped pitman link 152 generates a torque about the pitman arm shaft 150 proportional to the distance between the pitman arm shaft 150 and the connection point 162 of the connector 160 which is transmitted to the torque sensing link 158 via the L-shaped pitman link 152. This torque generates a compression force on the torque sensing link 158 at the connection point 164, which is measured by the deformation of the linear strain sensing element 163. The linear strain sensing element 163 sends an electrical signal to the ECU 77, which is proportional to the measured deformation which is itself proportional to the force applied to the handlebars. In response, the ECU 77 sends command signals to the actuator 112 (FIGS. 2 and 7) to lean the frame 58 to the right. The intensity of the command signal is proportional to the deformation of the linear strain sensing element 163 and thus determines how fast the actuator 112 should extend to tilt the frame 58. Furthermore, the relative motion between the steering column 22 and the shock tower 96 is measured by a slight deformation of the torque sensing link 158. However, no forces are transmitted to the steering column 22 since the steering column 22 is separated from the torque sensing link 158 by L-shaped pitman link 152. Thus, the relative movement between the shock tower 96 and the steering column 22 is independent from each other.

In a preferred embodiment, a speed sensor 149 (FIG. 9) is electrically connected to the ECU 77 and provides a electrical signal to the ECU 77 representative of the speed of the vehicle. The ECU 77 correlates the speed of the vehicle with the signals received from the sensor 163 to lean the frame 58 at the correct angle for a given speed.

Once the leaning is initiated by the actuators 112, the frame 58 begins to lean and the wheels 12 begin to tilt. At a certain angle of leaning corresponding to the required leaning angle for a given corner, the forces exerted onto the pitman arm link 152 and thus on the torque sensing link 150 and the steering rod 130 will fall into equilibrium. Once equilibrium is reached, the linear strain sensing element 163 will no longer measure any deformation and the actuators will receive signals to stop expanding or retracting and the frame 58 and wheels 12 will remain in their tilt position until more torque is applied to the steering column in the same or opposite direction. When the driver is exiting a right corner for example, he applies a counterclockwise torque to the steering column 22 which applies a tension force on the torque sensing link 158 which is measured by the linear strain sensing element 163 which send signals to the ECU 77 to redress the vehicle 10 by signalling the actuators to lean the frame 58 in the opposite direction until equilibrium is reached again.

In the assisted mode, the linear strain sensing element 163 senses small deformations of the torque sensing link 158 and sends electrical signals representative of the direction and magnitude of the torque applied to the steering column 22 to the ECU 77 which in turn activates the left and right actuators 112 accordingly to cause the frame 58 to lean to the correct side and at the correct speed. Assisted leaning systems equipped with hydraulic actuators 112 includes an hydraulic circuit comprising an hydraulic pump and a series of proportional valves to direct hydraulic pressure to the actuators 112.

It should be understood that steering linkage 126 and torque sensing link 158 illustrated in FIG. 8 is only one possible embodiment out of many possible embodiments. The linear strain sensing element 163 may be replaced by a variety of other sensors adapted to measure the torque applied to the steering column 22 that may relay this information to the ECU without deviating from the scope of the present invention. For instance, a torque sensor may be mounted directly to the steering column 22.

Figure 9:
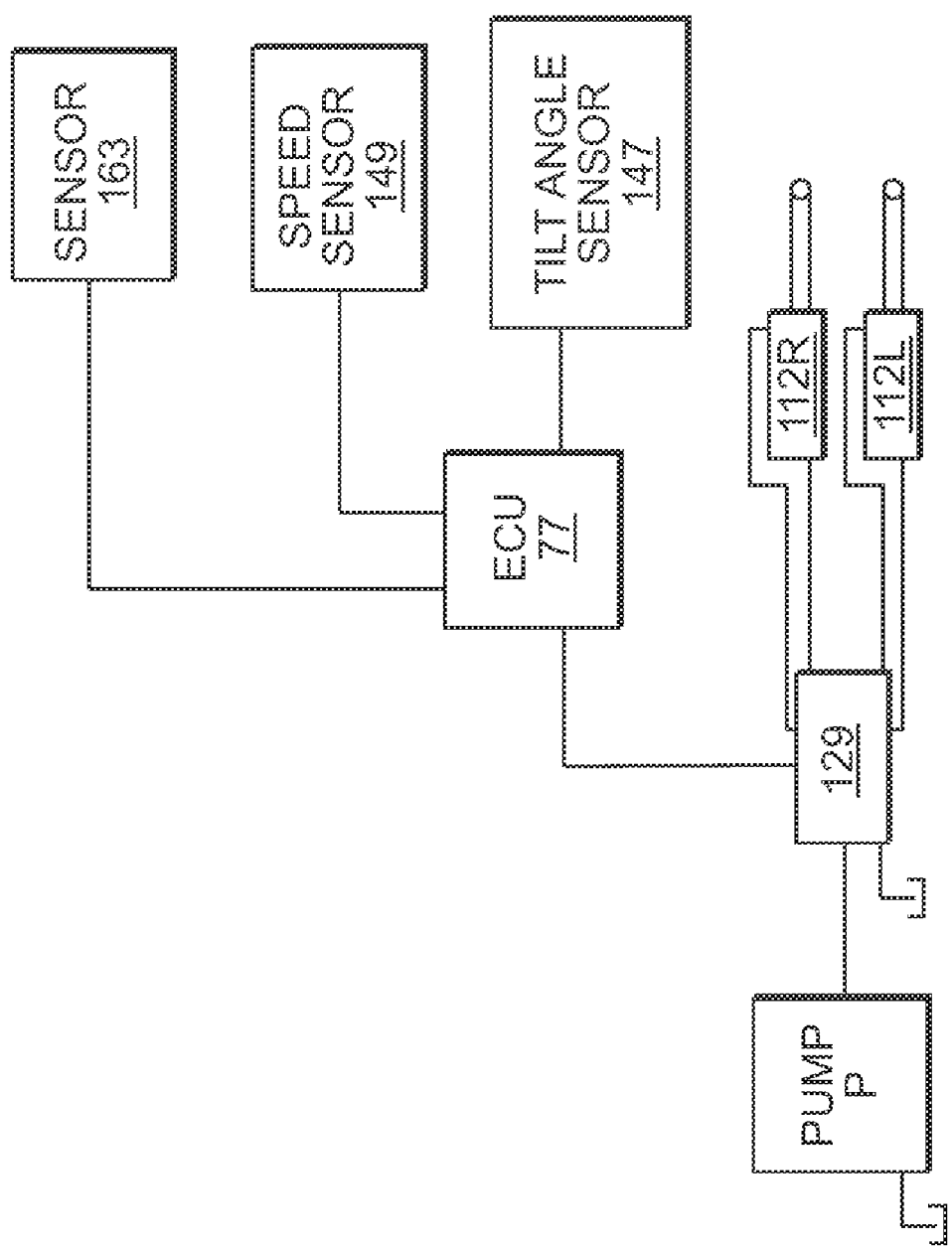
FIG. 9 is a block diagram of an embodiment of an hydraulic and electronic circuit for a vehicle leaning system of the three-wheel leaning vehicle of FIG. 1.

FIG. 9 is a block diagram illustrating an hydraulic and electronic circuit of an assisted leaning system in accordance with the first embodiment of the invention. The sensor 163 measures the torque applied to the steering column 22, sends a signal to the ECU 77 representative of the magnitude and direction of the torque. The ECU 77 also receives signals from the speed sensor 149. In response to the signal from sensor 163, the ECU 77 sends a signal to a four-way valve 129 proportional to the signal received from sensor 163 and correlated to the signal of the speed sensor 149 which directs the fluid pressure generated by the hydraulic pump P to extend or retract the hydraulic actuators 112R and 112L. The ECU 77 also preferably receives signals from a lean angle sensor 147 representative of the relative angle between the shock tower 96 and the frame 58 to keep track of the angle of the frame 58 relative to the shock tower 96.

Figure 10:
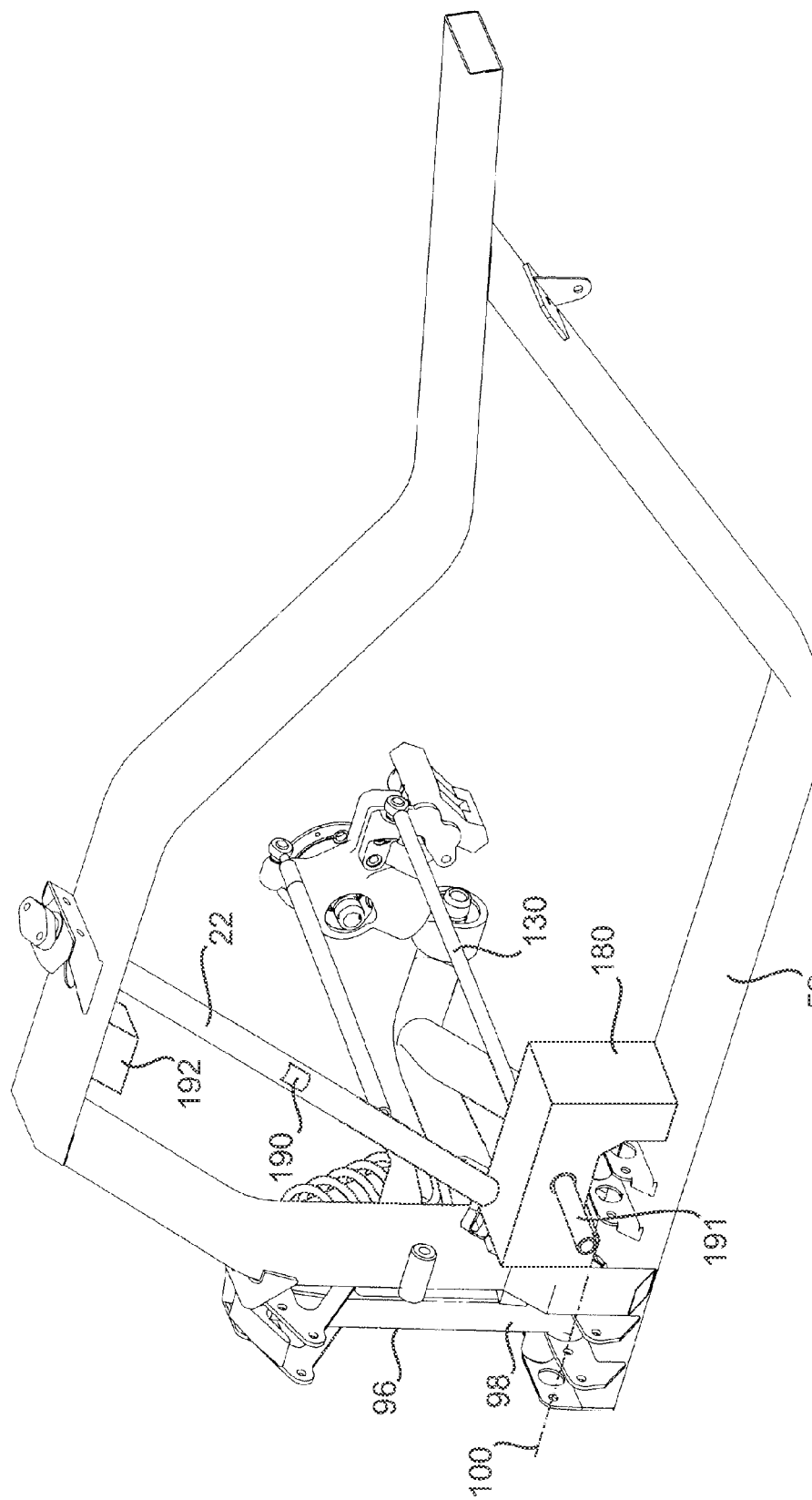
FIG. 10 is a rear left perspective view of the front suspension and frame of the three-wheel leaning vehicle in accordance with a second embodiment of the invention.
Figure 11:
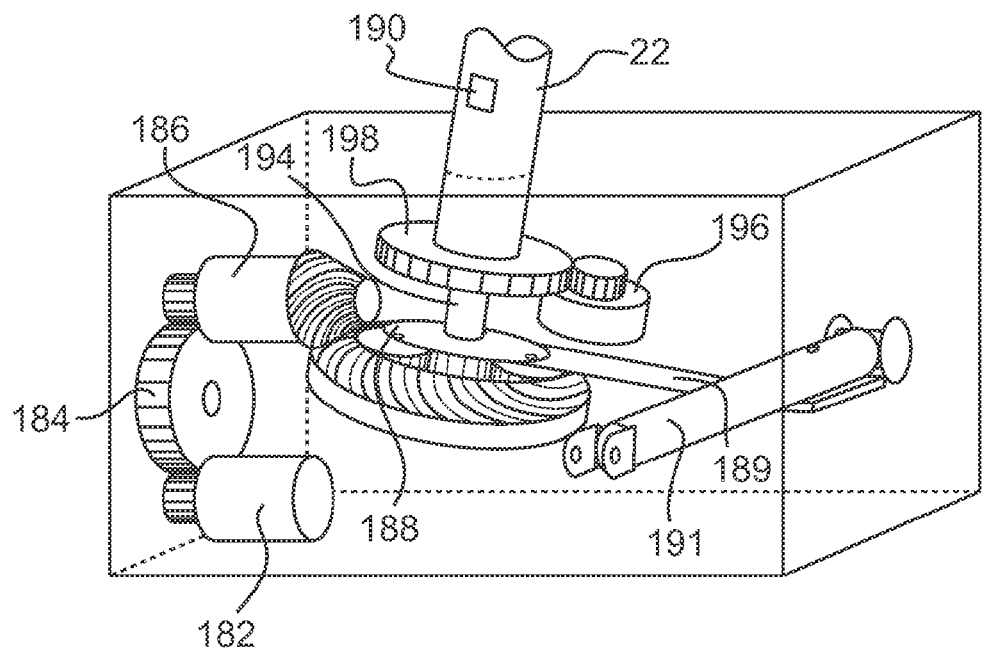
FIG. 11 is a rear left perspective view of the internal parts of a cleaning system for the three-wheel leaning vehicle of FIG. 10.

FIG. 10 illustrates an assisted leaning system in accordance with a second embodiment of the invention. A gearbox 180 is fixedly mounted to the lower member 59 of the frame 58. With reference to FIGS. 10 and 11, the gearbox 180 includes an electric motor 182 having a rotating gear engaging a gear 184 which is fixed to the bottom portion 98 of the shock tower 96 and co-axial with the leaning axis 100. When the electric motor 182 is activated, the electric motor 182 rotates around the fixed gear 184 and force the gearbox 180 and the frame 58 to rotate about the leaning axis 100. The vehicle 10 leans to one side or the other depending on the direction of rotation of the electric motor 182. An ECU 192 is electrically connected to the electric motor 182 of the gearbox 180 and controls the speed and direction of rotation of the electric motor 182.

It is also contemplated that the electric motor 182 be mounted to the shock tower 96 and the fixed gear 184 be mounted to the frame 58 such that when the electric motor 182 is activated, the electric motor 182 rotates the fixed gear 184 and forces the frame 58 to pivot about the leaning axis 100.

A torque sensor 190 is positioned on the steering column 22 and is electrically connected to the ECU 192. A torque applied to the steering column 22 by the driver will generate a proportional electrical signal from the torque sensor 190 which is sent to an ECU 192. Many types of torque sensors may be used. An example is a magnetic sensor which measures an offset between the upper and lower portion of the steering column 22 and generates a voltage representative of the magnitude and direction of the torque applied to the steering column 22. The ECU 192 receives electrical signals from the torque sensor 190 and sends corresponding electrical signals to the electric motor 182 of the gearbox 180 to cause the frame 58 to pivot about the leaning axis 100 at a specific speed and in a given direction corresponding to the torque applied by the driver to the steering column 22.

The gearbox 180 also includes a gear shaft 186 having a first gear 185 engaging the fixed gear 184 and a second gear 187 engaging a planetary gear unit 188. A pitman arm 189 is connected to the planet carrier of the planetary gear unit 188. The pitman arm 189 is connected to a steering shaft 191 itself connected to the steering rods 130. The end portion 194 of the steering column 22 includes a gear which acts as the sun gear of planetary gear unit 188. The gear shaft 186 therefore connects the shock tower 96 to the planetary gear unit 188 and the steering rods 130.

When the steering column 22 is turned clockwise, the torque applied to the steering column 22 is captured by the torque sensor 190, sending a signal to the ECU 192 which in turn, activates the electric motor 182 to pivot the frame to the right. The planet carrier of the planetary gear unit 188 also rotates clockwise, thus the pitman arm 189 rotates clockwise moving the steering shaft 191 and the steering rods 130 towards the left thereby turning the wheels 12 to the right. Simultaneously, the gear shaft 186 is forced to rotate clockwise about fixed gear 184, causing the ring gear the planetary gear unit 186 to rotate counterclockwise, thus reducing the motion of the steering shaft 191 and the steering rods 130 towards the left and creating an understeer gradient. The net direction of the pitman arm from the inputs from the end portion 194 of the steering column 22 and from gear shaft 186 will be determined through the ratios of the gears, however the net direction will remain clockwise for a right hand turn.

A second electric motor 196 is connected to the steering column 22 through a fixed gear 198 mounted onto the steering column 22 and electrically connected to the ECU 192. Electric motor 196 is to generate a torque in the steering column 22 in the opposite direction of the torque produced by the driver turning the steering column 22 in order to generate a countersteering effect. In order to lean the frame, countersteering is desirable to initiate the leaning. Furthermore, once the wheels 12 begin to tilt, a gyroscopic effect on the wheels tends to accentuate the turning of the wheels 12 that should be controlled to avoid undue oversteer. The electric motor 196 helps the driver maintain the vehicle 10 at the desired angle without having to counter the gyroscopic effect with his or her own strength.

Figure 12:
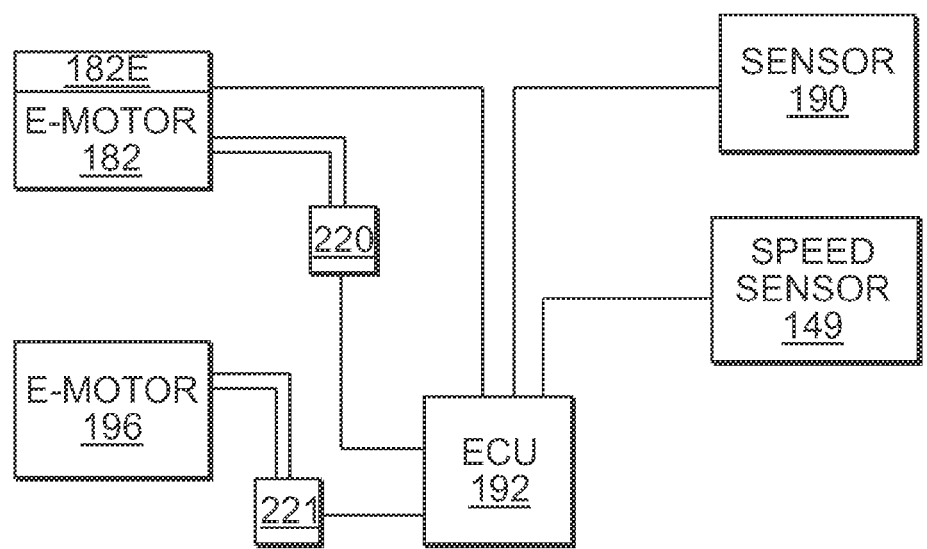
FIG. 12 is a block diagram of an embodiment of an electric and electronic circuit for the three-wheel leaning vehicle of FIG. 10.

FIG. 12 is a block diagram illustrating an electric and electronic circuit of an assisted leaning system in accordance with the second embodiment of the invention. The sensor 190 measures the torque applied to the steering column 22, sends a signal to the ECU 192 representative of the magnitude and direction of the torque. The ECU 192 also receives signals from the speed sensor 149. In response to the signal from sensor 190, the ECU 192 sends a proportional signal, correlated with the signal received from the speed sensor 149, to a power module 220 which delivers to the electric motor 182 an electric current corresponding to the magnitude and direction of the signal received from the sensor 190 to cause the frame 58 to lean one way or the other. The electric motor 182 includes a position encoder 182E which relays signals to the ECU 192 representative of the relative angle between the shock tower 96 and the frame 58. When initiating the leaning motion of the frame 58, the ECU 192 also sends signals to the electric motor 196 to generate the countersteering effect described above.

In a specific embodiment when the vehicle speed sensor 149 sends a signal below a threshold value representative of a minimum vehicle speed, the ECU sends no command signal to the actuator and the steering column 22 can turn the wheels 12 independently of the leaning of the frame 58 relative to the shock tower 96.

Figure 13:
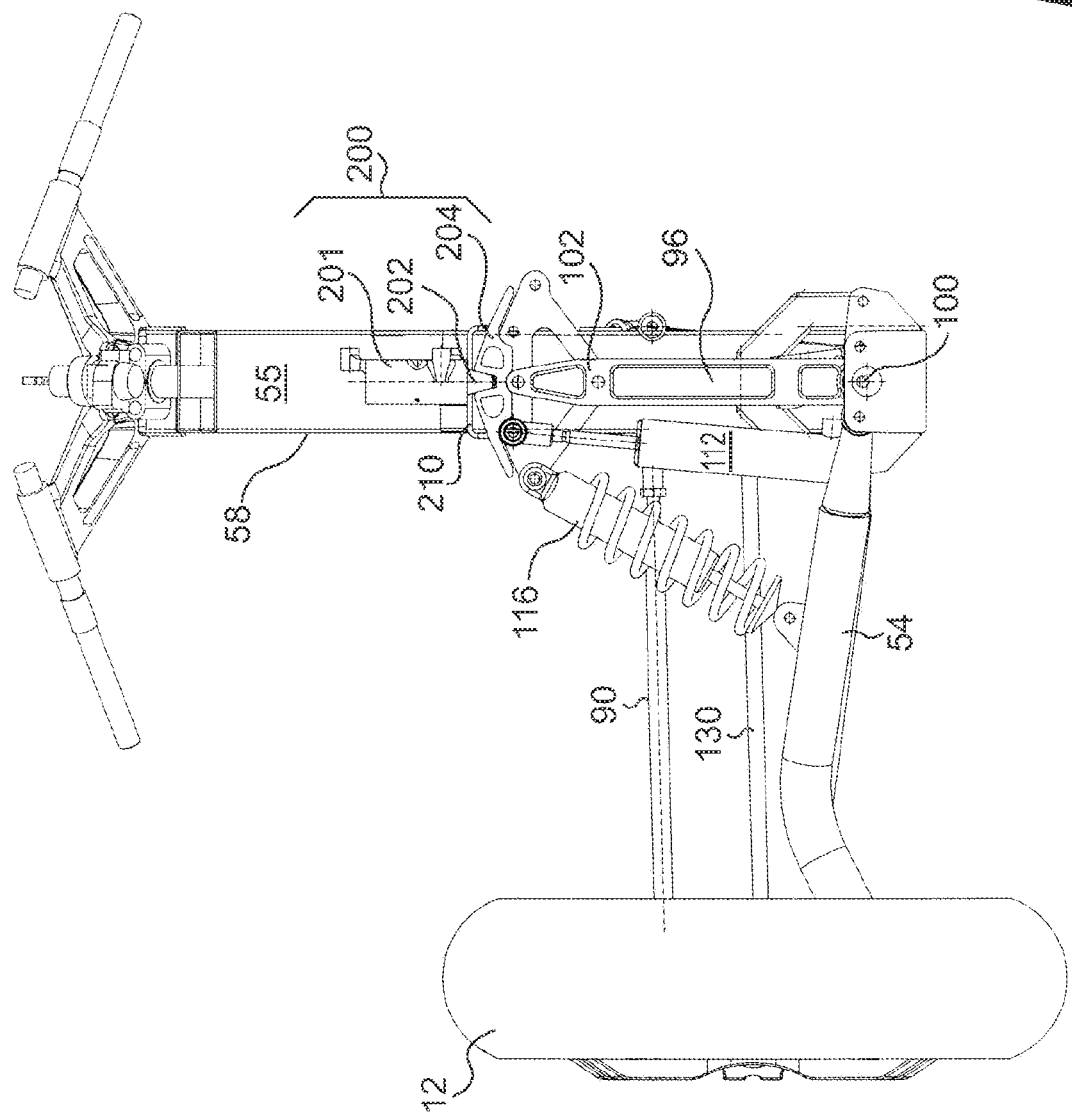
FIG. 13 is a front elevation view of the front suspension and frame of the three-wheel leaning vehicle of FIG. 1 with one part having been removed for clarity.
Figure 14:
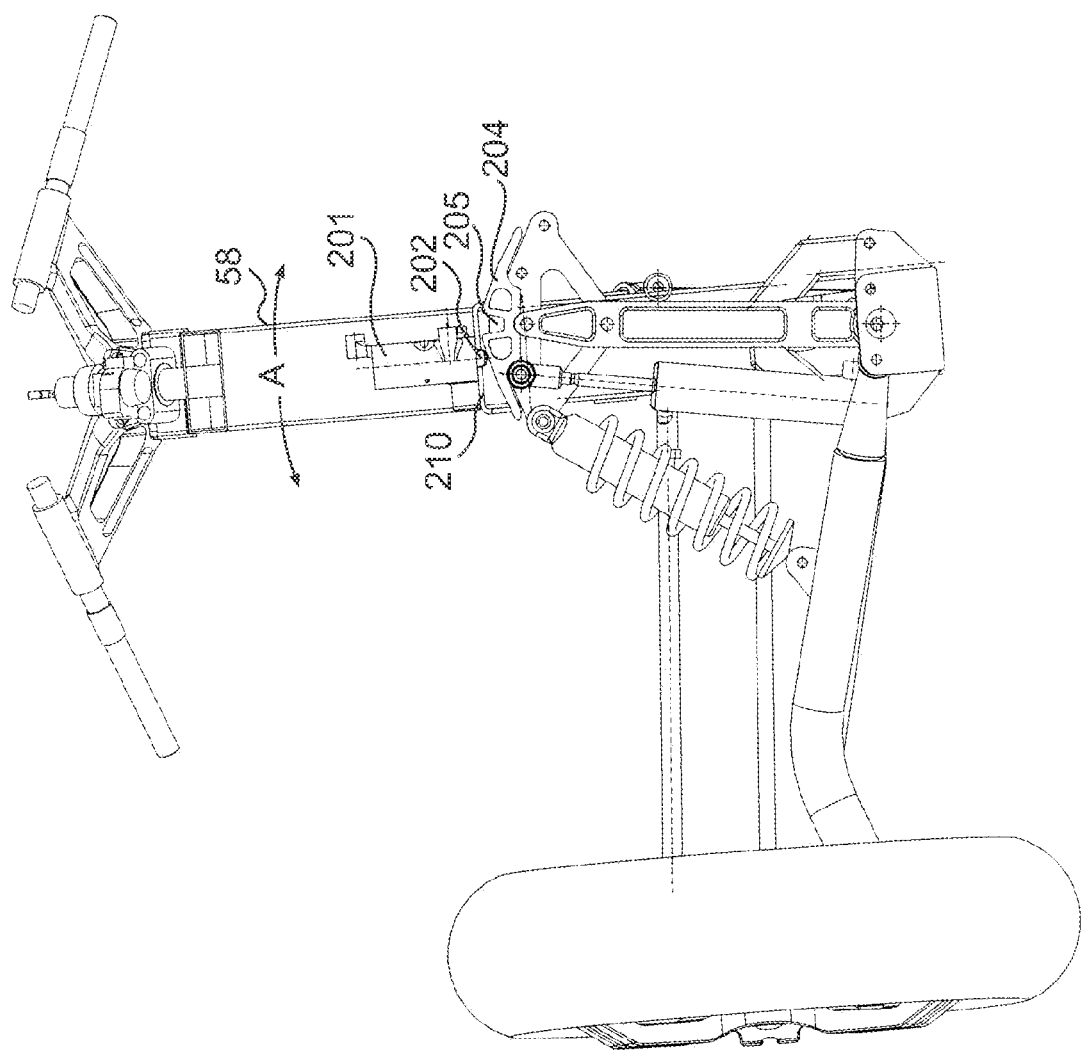
FIG. 14 is a front elevation view of the front suspension and frame illustrated in FIG. 13 tilted to one side.

With reference to FIGS. 13 and 14, the leaning vehicle 10 is preferably equipped with a lock 200 to secure the frame 58 to the shock tower 96 and prevent relative movements between the frame 58 and the shock tower 96 about the frame leaning axis 100. The lock 200 may be used for parking or for low speed driving. The locking mechanism 200 includes a mechanical or electrical actuator 201 mounted onto a bracket 210 itself secured to the upright member 55 of the frame 58. A locking pin 202 protrudes from a lower portion of the actuator 201 and is adapted to move in and out of the actuator 201 upon command. The upper end 102 of the shock tower 96 is shown with the front portion of bracket 104 removed. As can be seen, a notch plate 204 having a notch 205 is secured to the upper end 102 of the shock tower 96. In the locking position, the locking pin 202 engages the notch 205, as illustrated in FIG. 13, to lock the frame 58 and the shock tower 96.

The actuator 201 maintains the locking pin 202 engaged to the notch 205 until a command is received either electrically or mechanically to pull the locking pin 202 out of engagement with the notch 205 and free the frame 58 from the shock tower 96. As illustrated in FIG. 14, once the locking pin 202 is pulled in, the frame 58 may lean to the right or to the left relative to the shock tower 96 as depicted by arrow A. The notch plate 204 is preferably made of plastic material to enable the locking pin 202 to easily slide along the surface of the notch plate 204.

In a preferred embodiment, the actuator 201 is electrical and is electrically connected to the ECU 77 or 192. The ECU 77 or 192 is monitoring a series of parameters such as vehicle speed, leaning speed and leaning angle of the frame 58 such that the ECU may send a signal to the actuator 201 to lock the frame 58 to the shock tower 96 when the vehicle speed falls below a minimum threshold speed thereby providing safe low-speed driving operation. The ECU may also prevent the locking pin 202 from engaging the notch 205 in specific circumstances such as when the leaning speed of the frame 58 is high to avoid breaking the locking pin 202. The ECU may also be programmed to lock the frame 58 to the shock tower 96 whenever the vehicle 10 comes to a stop thereby preventing the user from having to hold the vehicle 10 upright with his legs.

Although, only one locking notch 205 is shown corresponding to only one locking position, the notch plate 204 may include a series of locking notches corresponding to more than one locking position which can be useful to accommodate parking the vehicle 10 on a slanted surface such that the frame 58 could be locked in the vertical position while not perpendicular to the ground. As previously mentioned the frame 58 can be locked whenever the vehicle 10 is coming to a stop. If there is a bump in the road where the vehicle 10 is stopping, then the appropriate locking notch would be used so that the frame 58 is locked in the vertical position.

While the invention has been described in connection with what is presently considered to be the most practical and preferred embodiments, it is to be understood that the invention is not to be limited to the disclosed embodiments and elements, but, to the contrary, is intended to cover various modifications, combinations of features, equivalent arrangements, and equivalent elements included within the spirit and scope of the appended claims. Furthermore, the dimensions of features of various components that may appear on the drawings are not meant to be limiting, and the size of the components therein can vary from the size that may be portrayed in the figures herein. Thus, it is intended that the present invention covers the modifications and variations of the invention, provided they come within the scope of the appended claims and their equivalents.

What is claimed is:

1. A leaning vehicle comprising:
a frame having a front portion, a rear portion, a lower portion and an upper portion;
an engine supported by the frame;
a shock tower having an upper end and a lower end, the lower end of the shock tower being pivotally connected to the front portion of the frame through a pivotal connection that defines a frame leaning axis about which the frame can lean to a right side and to a left side relative to the shock tower;
an actuator operatively connected to the frame and to the upper end of the shock tower, the actuator being operatively connected to the upper end of the shock tower at a point laterally offset from the frame leaning axis, the actuator adapted to impart a leaning motion to the frame relative to the shock tower about the frame leaning axis;
a front left wheel and a front right wheel connected to the front portion of the frame via a front left suspension assembly and a front right suspension assembly respectively;
a steering assembly having a rotatable steering column supported by the frame and operatively connected to the front left wheel and the front right wheel;
a rear suspension connected to the rear portion of the frame;
at least one rear wheel connected to the rear suspension, at least one of the wheels being operatively connected to the engine; and
a braking system operatively connected to at least one wheel,
each front suspension assembly including:
a lower suspension arm pivotally connected to the frame at a first end and pivotally connected to the wheel at a second end; and
a shock absorber having an upper end connected to the upper end of the shock tower at a point laterally offset from the frame leaning axis on a corresponding side of the frame leaning axis and a lower end connected to the lower suspension arm.

2. A leaning vehicle as defined in claim 1, wherein each front suspension assembly further includes a leaning rod connected to the frame at a proximal end and to the corresponding wheel at a distal end, the leaning rod imparting a tilting motion to the corresponding wheel about a wheel tilting axis when the frame is leaning, the tilting motion of the corresponding wheel being proportional to the leaning of the frame about the frame leaning axis.

3. A leaning vehicle as defined in claim 2, wherein the wheel tilting axis is defined by the pivotal connection of the lower suspension arm to the wheel.

4. A leaning vehicle as defined in claim 2, wherein the lower suspension arm includes a curved portion to provide clearance between the wheel and the lower suspension arm when the wheel is tilting about a wheel tilting axis.

5. A leaning vehicle as defined in claim 1, further comprising an electronic control unit (ECU) electrically connected to at least one sensor adapted to detect a direction and magnitude of a torque applied to the steering column and to send corresponding signals to the ECU representative of the direction and magnitude of the torque applied to the steering column; the ECU being operatively connected to the actuator; wherein in response to signals from the at least one sensor, the ECU sends command signals to the actuator to lean the frame relative to the shock tower in a direction and at a speed corresponding to the direction and magnitude of the torque applied to the steering column.

6. A leaning vehicle as defined in claim 5, wherein the actuator includes an hydraulic piston-cylinder assembly having a first end connected to the upper end of the shock tower and a second end connected to the lower portion of the frame; a connection point of the hydraulic piston-cylinder assembly to the lower portion of the frame being laterally offset relative to the frame leaning axis such that extension and retraction of the hydraulic piston-cylinder assembly impart the leaning motion of the frame relative to the shock tower.

7. A leaning vehicle as defined in claim 1, further comprising an actuated lock to secure the frame to the shock tower and prevent relative movement between the frame and the shock tower about the frame leaning axis.

8. A leaning vehicle as defined in claim 1, wherein the front wheel is mounted to a spindle having a top portion and a lower portion, the top portion being rotatably connected to the lower portion about a steering axis such that the top portion may rotate relative to the lower portion to steer the wheel about the steering axis.

9. A leaning vehicle as defined in claim 8, wherein the lower portion of the spindle is pivotally connected to the lower suspension arm thereby defining the wheel tilting axis.

10. A leaning vehicle as defined in claim 9, wherein the lower portion of the spindle is a T-joint rotatably connected to the top portion about the steering axis and pivotally connected to the lower suspension arm about the wheel tilting axis.

11. A leaning vehicle as defined in claim 1, wherein the frame is adapted to lean relative to the shock tower by an angle φ of between 0° and 50° to the right side and to the left side.

12. A leaning vehicle comprising:
a frame having a front portion, a rear portion, a lower portion and an upper portion;
an engine supported by the frame;
a shock tower having an upper end and a lower end, the lower end of the shock tower pivotally connected to the front portion of the frame through a pivotal connection that defines a frame leaning axis about which the frame can lean to a right side and to a left side relative to the shock tower;
a front left wheel and a front right wheel connected to the front portion of the frame via a front left suspension assembly and a front right suspension assembly respectively;
a steering assembly having a steering column supported by the frame and operatively connected to the front left wheel and the front right wheel;
a rear suspension connected to the rear portion of the frame;
at least one rear wheel connected to the rear suspension; at least one of the wheels being operatively connected to the engine;
a braking system operatively connected to at least one wheel, each front suspension assembly including:
- a lower suspension arm pivotally connected to the frame at a first end and pivotally connected to the wheel at a second end; and
- a shock absorber having an upper end connected to the upper end of the shock tower and a lower end connected to the lower suspension arm; and
- an actuated lock to lock the frame to the shock tower and prevent relative movement between the frame and the shock tower about the frame leaning axis.

13. A leaning vehicle as defined in claim 12, wherein the actuated lock includes a locking pin adapted to engage a notch plate having at least one notch, the locking pin being mounted to at least one of the frame and the shock tower and the notch plate being mounted to an other one of the frame and the shock tower, whereby when the locking pin engages the at least one notch, the frame is prevented from moving relative to the shock tower.

14. A leaning vehicle as defined in claim 13, wherein the notch plate includes a plurality of notches corresponding to a plurality of locking positions of the frame relative to the shock tower.

15. A leaning vehicle as defined in claim 12, further comprising an electronic control unit (ECU) operatively connected to the actuated lock, wherein the ECU sends command signals to the actuated lock to lock and unlock the frame relative to the shock tower.

16. A leaning vehicle comprising:
- a frame having a front portion, a rear portion, a lower portion and an upper portion;
- an engine supported by the frame;
- a shock tower having an upper end and a lower end, the lower end of the shock tower pivotally connected to the front portion of the frame through a pivotal connection that defines a frame leaning axis about which the frame can lean to a right side and to a left side relative to the shock tower;
- a front left wheel and a front right wheel connected to the front portion of the frame via a front left suspension assembly and a front right suspension assembly respectively;
- a steering assembly having a steering column supported by the frame and operatively connected to the front left wheel and the front right wheel;
- a rear suspension connected to the rear portion of the frame; and
- at least one rear wheel connected to the rear suspension, at least one of the wheels being operatively connected to the engine,
- each front suspension assembly including:
  - a spindle carrying the corresponding wheel and a braking system;
  - a lower suspension arm pivotally connected to the frame at a first end about a pivot axis generally parallel to the frame leaning axis and pivotally connected to the spindle at a second end, the spindle thereby defining a wheel tilting axis, the wheel tilting axis being generally parallel to the pivot axis, the spindle axis defining a steering axis angled relative to the wheel tilting axis; and
  - a shock absorber having an upper end connected to the upper end of the shock tower and a lower end connected to the lower suspension arm,
  - the spindle being constructed to transmit all of a braking torque produced by the braking system to the lower suspension arm.

17. A leaning vehicle as defined in claim 16, wherein each spindle includes a top portion and a lower portion, the top portion being rotatably connected to the lower portion about the steering axis such that the top portion may rotate relative to the lower portion to steer the corresponding wheel about the steering axis.

18. A leaning vehicle as defined in claim 17, wherein the lower portion of the spindle is a T-joint rotatably connected to the top portion about the steering axis and pivotally connected to the lower suspension arm about the wheel tilting axis.

19. A leaning vehicle comprising:
- a frame having a front portion, a rear portion, a lower portion and an upper portion;
- an engine supported by the frame;
- a shock tower having an upper end and a lower end, the lower end of the shock tower pivotally connected to the front portion of the frame through a pivotal connection that defines a frame leaning axis about which the frame can lean to a right side and to a left side relative to the shock tower;
- a front left wheel and a front right wheel connected to the front portion of the frame via a front left suspension assembly and a front right suspension assembly respectively;
- a steering assembly having a rotatable steering column supported by the frame, the steering column being operatively connected to the front left wheel, to the front right wheel and to the shock tower,
- a rear suspension connected to the rear portion of the frame;
- at least one rear wheel connected to the rear suspension, at least one of the wheels being operatively connected to the engine; and
- a braking system operatively connected to at least one wheel,
- each front suspension assembly including:
  - a lower suspension arm pivotally connected to the frame at a first end and pivotally connected to the wheel at a second end;
  - a shock absorber having an upper end connected to the upper end of the shock tower and a lower end connected to the lower suspension arm; and
  - a leaning rod connected to the frame at a proximal end and to the corresponding wheel at a distal end, the proximal end being connected to the frame at a position vertically between the frame leaning axis and a connection between the upper end of the shock tower and the shock absorber, the leaning rod imparting a tilting motion to the corresponding wheel about a wheel tilting axis when the frame is leaning.

20. A leaning vehicle as defined in claim 19, wherein the steering column is operatively connected to the shock tower through a pitman link.

21. A leaning vehicle as defined in claim 20, wherein the pitman link is connected to the shock tower via a torque sensing link.

22. A leaning vehicle as defined in claim 19, wherein the steering column is operatively connected to the shock tower through a planetary gear unit.

* * * * *

UNITED STATES PATENT AND TRADEMARK OFFICE
CERTIFICATE OF CORRECTION

PATENT NO. : 7,648,148 B1  Page 1 of 1
APPLICATION NO. : 11/429000
DATED : January 19, 2010
INVENTOR(S) : Daniel Mercier It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 713 days.

Signed and Sealed this

Sixteenth Day of November, 2010

David J. Kappos
*Director of the United States Patent and Trademark Office*